Dec. 28, 1954 H. S. BEATTIE 2,698,136

TAPE ACTUATED COUNTER

Filed Jan. 30, 1953 5 Sheets-Sheet 1

INVENTOR
HORACE S. BEATTIE

BY Harry T. Berriman
AGENT

Dec. 28, 1954 H. S. BEATTIE 2,698,136

TAPE ACTUATED COUNTER

Filed Jan. 30, 1953 5 Sheets-Sheet 2

INVENTOR
HORACE S. BEATTIE
BY Harry T. Berriman
AGENT

INVENTOR
HORACE S. BEATTIE
BY *Harry T. Berriman*
AGENT

INVENTOR
HORACE S. BEATTIE
BY Harry T. Berriman
AGENT

INVENTOR
HORACE S. BEATTIE
BY Harry T. Berriman
AGENT

United States Patent Office 2,698,136

Patented Dec. 28, 1954

2,698,136

TAPE ACTUATED COUNTER

Horace S. Beattie, Poughkeepsie, N. Y., assignor to International Business Machines Corporation, New York, N. Y., a corporation of New York Application January 30, 1953, Serial No. 334,301

12 Claims. (Cl. 235—61.8)

This invention relates to counting mechanisms and more particularly to counters of the electro-mechanical type.

A preferred form of the counter may comprise a toothed counting wheel which is adapted to represent any one of the decimal digits 1 to 0 dependent upon its angular displacement from a home or zero position. The counting wheel is displaced angularly by means of a thin metal tape of relatively small mass. The tape has a series of openings each of which is slightly larger than a tooth of the counting wheel and is spaced from its adjacent openings by a distance equal to the spacing between adjacent teeth of the wheel. Normally, the tape is free of engagement with the counting wheel. When it is desired to enter a number into the counting wheel, the tape is engaged therewith, whereafter, the tape is displaced a number of units equivalent to the absolute value of the entry digit. A unit of movement of the tape is a distance equal to the spacing between adjacent teeth of the wheel. As the tape is displaced, the whel is accordingly displaced angularly an equivalent number of teeth. Thereafter, the tape is disengaged from the wheel and restored to a normal position. Later in the counter cycle, the tape is again engaged with the wheel and if there is to be a carry into the counter wheel, the tape is then displaced one unit.

For displacing the tape, there are provided four selector levers each of which is assigned a particular weighted value in accordance with a self-complementing 4, 2, 2′, 1 binary code. Each selector lever is operatively connected to the tape, in such a manner, that an operation of that lever effects a corresponding 4, 2, 2 or 1 unit displacement of the tape. By operating the selector levers singly or in combination, any displacement of the tape from 1 to 9 units may be obtained.

The selector levers are rendered operative by selectively linking them to an add or a subtract bail under the control of perforated records in which numbers are represented in an 8, 4, 2, 1 binary code. The levers are normally engaged with the subtract bail. A number is represented in a particular column of a record by perforating the 8, 4, 2, 1 index points thereof singly or in combination as required. An eight, for example, is indicated in a record by perforating it in the eight index point of the desired column of the record. Upon a sensing of the 8 perforation by conventional sensing means, the 4, 2 and 2 (total 8) selectors are linked to the add bail while the 1 lever remains engaged with the subtract bail. If the number in the record is positive, the add bail is then operated, which in turn, operates the 4, 2 and 2 selectors and enters eight into the counting wheel. If the number 8 in the record is negative, which is indicated by a special perforation therein sensed by a separate sensing means, the subtract bail rather than the add bail is operated. Since only the one selector is engaged with the subtract bail, one or the 9's complement of the record value 8 is entered into the counting wheel. Thus subtraction is readily accomplished in the counter by the well known 9's complement method. The net result of this type of operation is a counter which accepts numeric information coded in a conventional 8, 4, 2, 1 binary code, translates it to a 4, 2, 2′, 1 self-complementing code to simplify operations with negative numbers, and then sets up a counter wheel on a straight decimal basis. The small mass of the counter setup tape permits it to be shifted very rapidly any amount from 1 to 9 units with a minimum of movement of the selector levers. This permits a fast operating counter.

An object of the invention is to provide a counter of the wheel type which is fast in operation.

Another object of the invention is to provide a counter which accepts binary coded decimal values and yet accumulates these values in a conventional decimal manner.

Another object of the invention is to provide a counter which accepts decimal numerical information coded in a 8, 4, 2, 1 binary code, translates the coded information into a self-complementing 4, 2, 2′, 1 binary code to facilitate counter operation on negative numbers, and yet accumulates in a conventional decimal fashion.

Another object of the invention is to provide a wheel type counter wherein the various decimal digits are entered therein by displacing the counter wheel angularly a corresponding number of angular units by a straight line movement of a metal tape of relatively small mass operatively linked to the counter wheel.

Another object of the invention is to provide a wheel type counter which represents by its number of angular units of displacement from a zero position a corresponding decimal value 1 to 9, the wheel being displaced by a corresponding displacement of an associated driving tape; the tape itself being displaced by the operation, singly or in combination, as required, of associated levers each of which is assigned a weighted decimal value in accordance with a predetermined code.

Other objects of the invention will be pointed out in the following description and claims and illustrated in the accompanying drawings, which disclose, by way of example, the principle of the invention and the best mode, which has been contemplated, of applying that principle.

Figure 6:
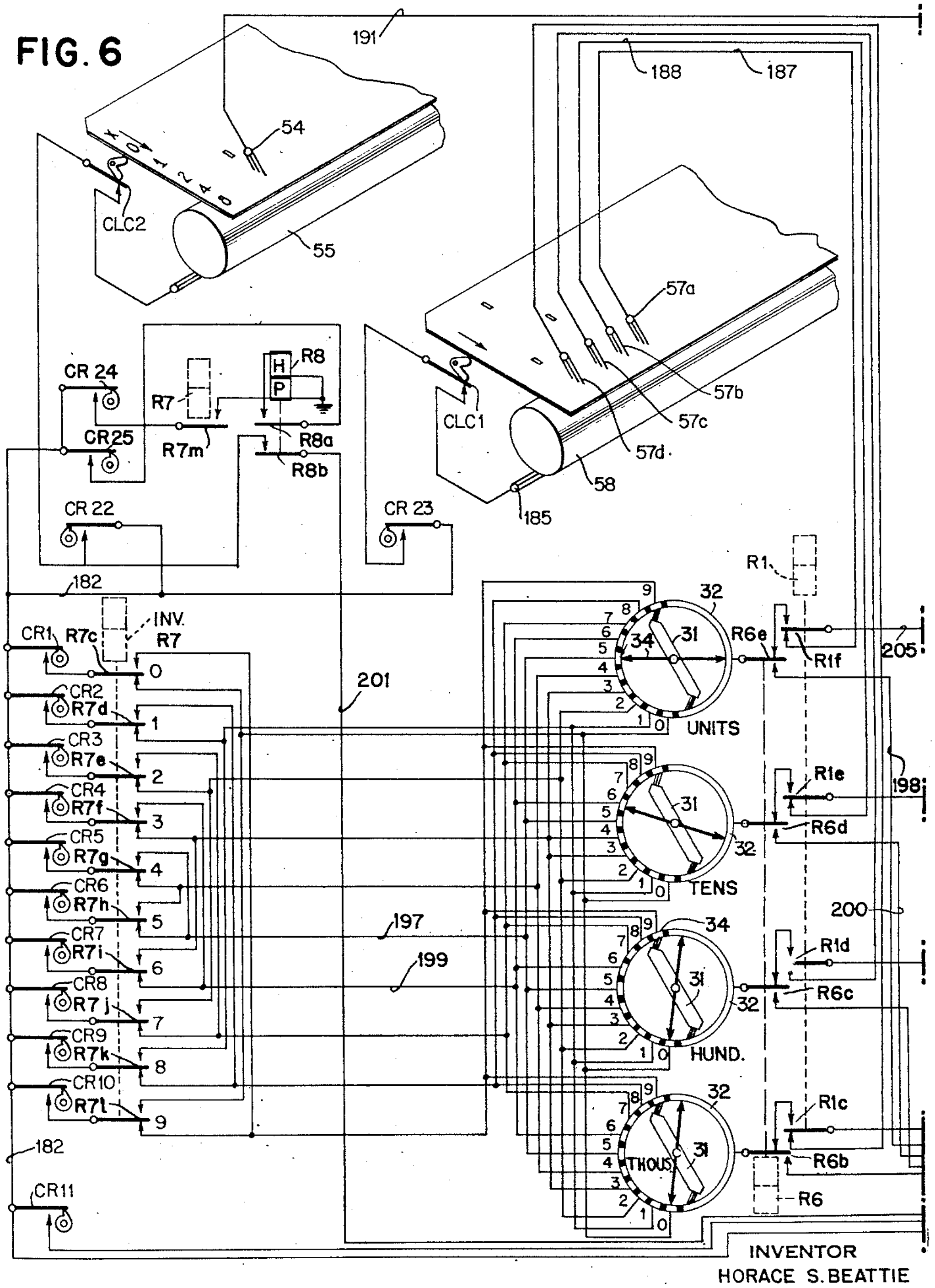
Figure 6A:
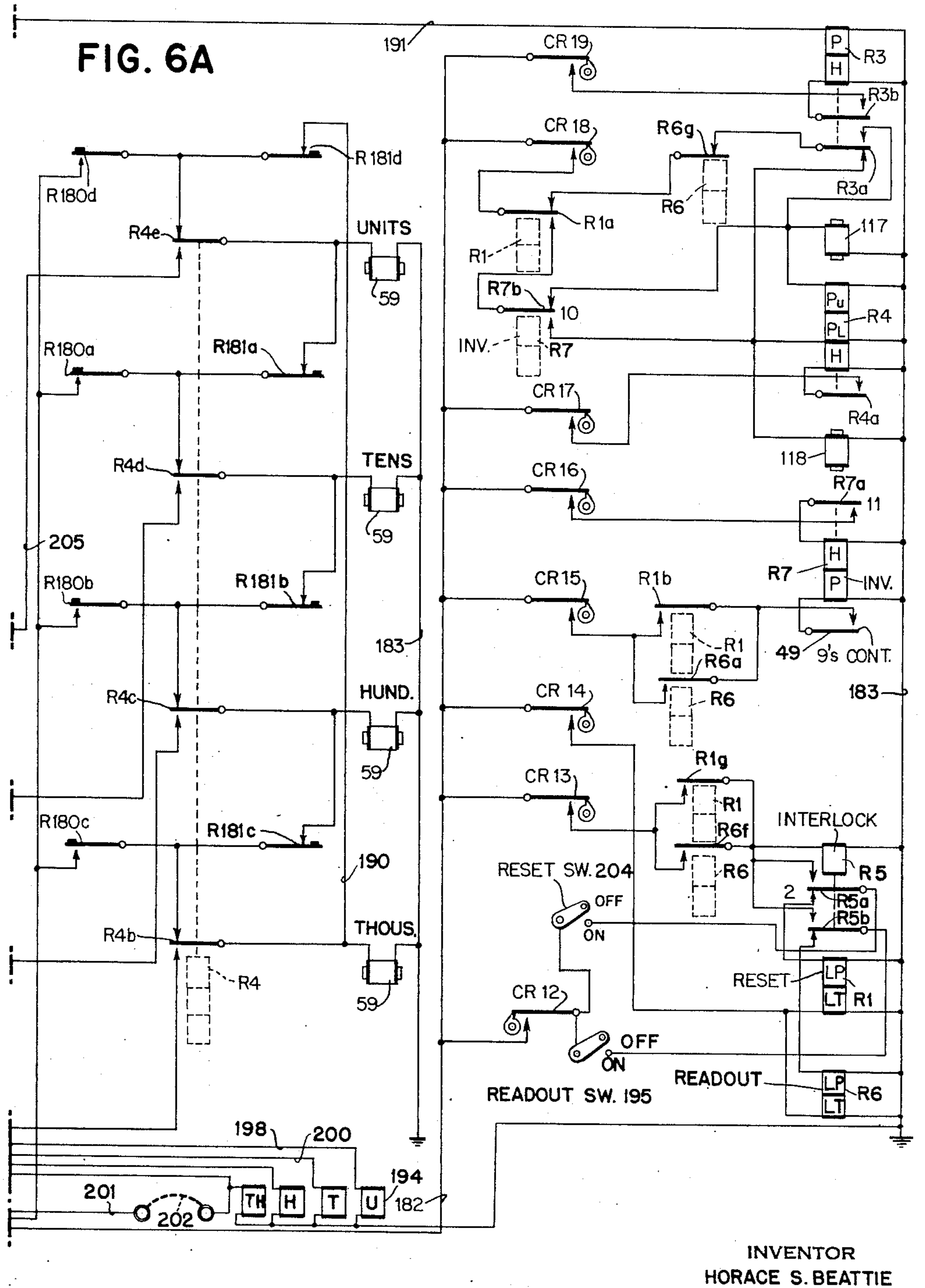

Figs. 6 and 6A comprise a diagrammatic circuit representation of four of the counter units connected in cascade so as to form a complete 4 order accumulating machine.

Figure 7:
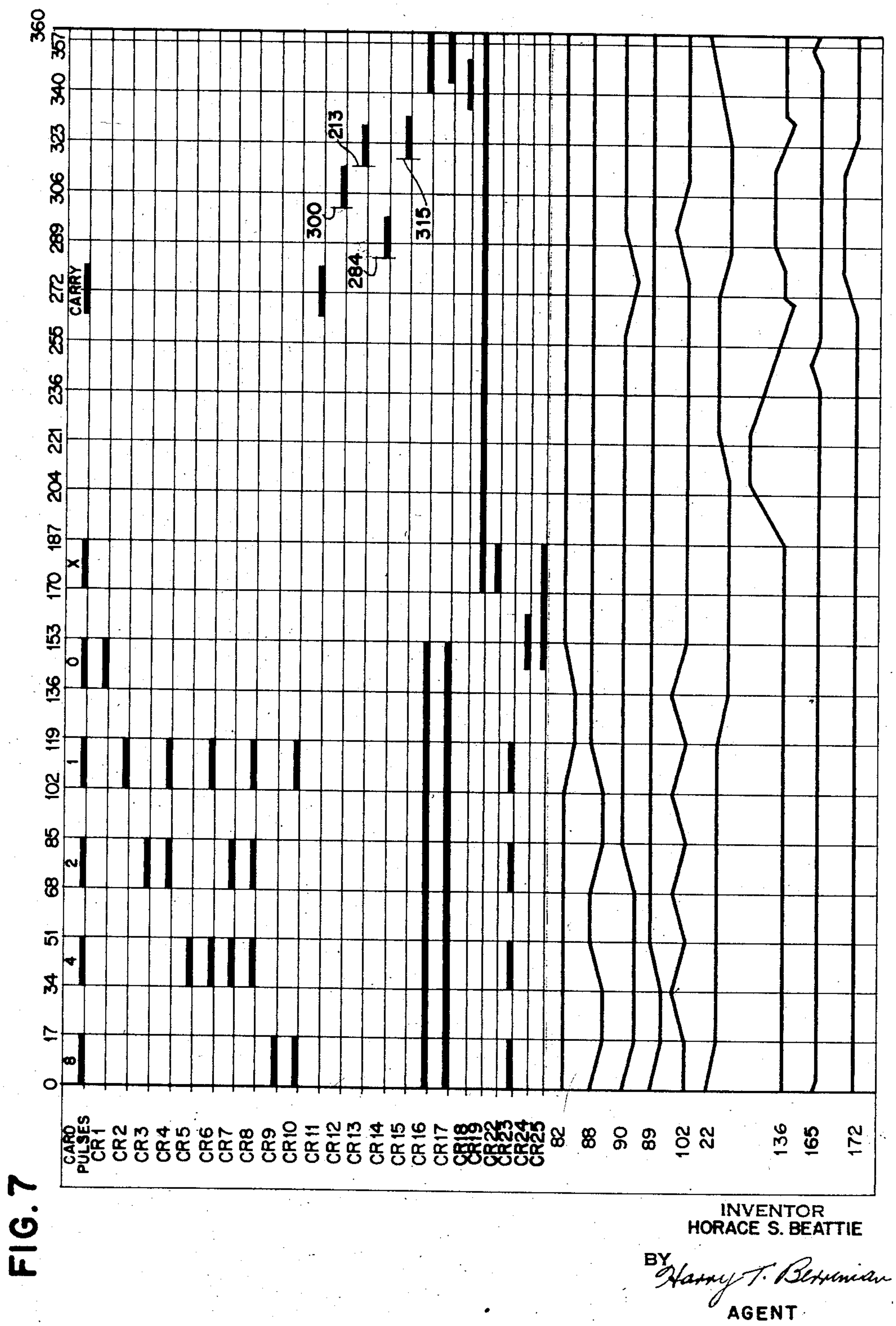

Fig. 7 is an electrical and mechanical timing diagram.

Figure 1:
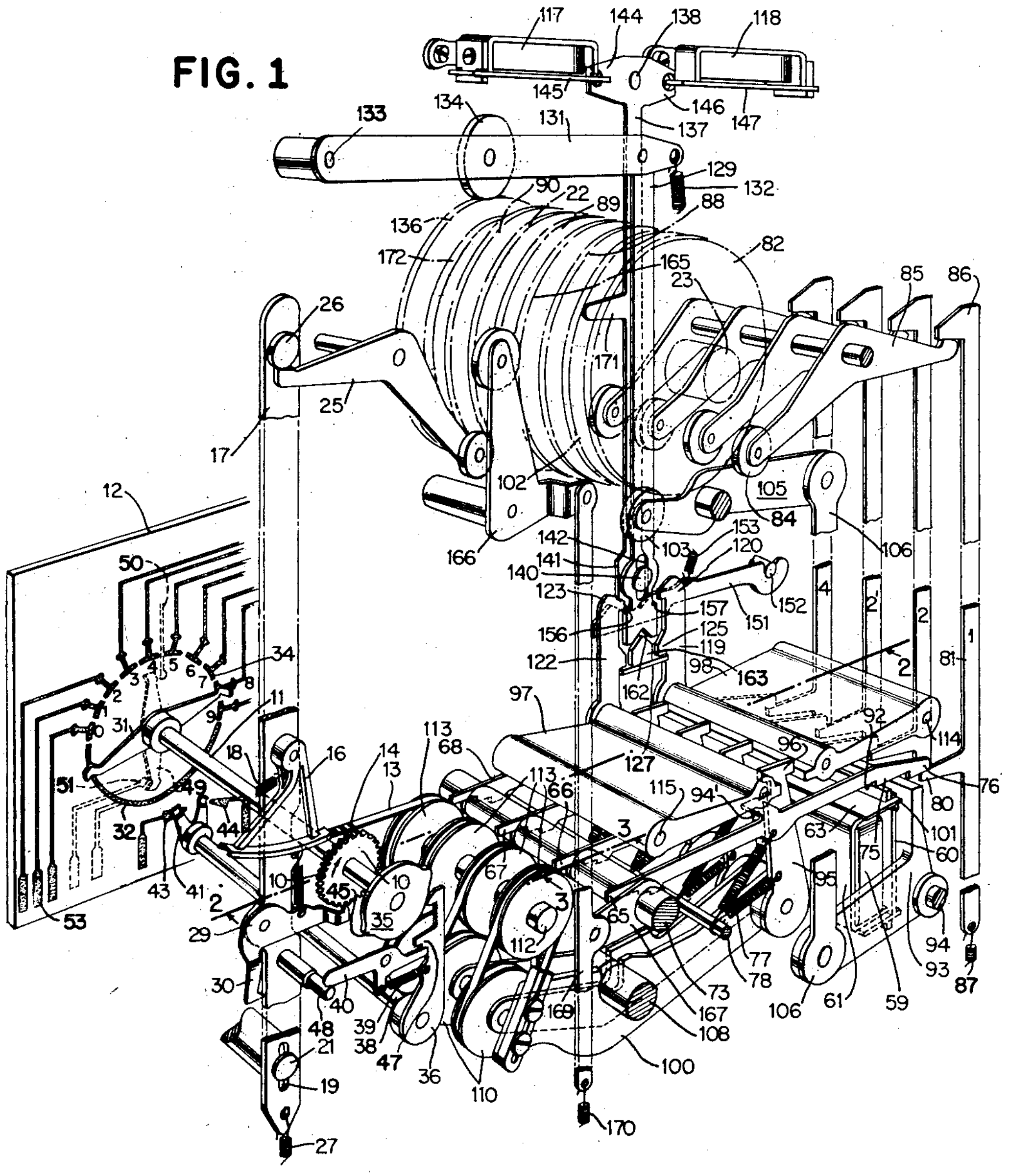
Fig. 1 is a perspective view of the counter with various frame and support members being omitted therefrom in order to give a clear view of the essential mechanism.

Referring to Fig. 1, there is shown a single order tape counter mechanism with various stationary frame members and guide members being removed therefrom in order to give an unobstructed view of the actual counter mechanism. The counter includes a twenty toothed counting wheel 10 secured to a shaft 11 which extends through and is rotatably supported near its rearward end by a fixed plate 12 formed of an insulating material. The forward end of the shaft is rotatably supported in a suitable front frame member (not shown). The twenty teeth of the wheel divide it into twenty angular increments of 18 degrees each. Both the 0 and 180 degree points of the counting wheel represent numerical zero with each succeeding 18 degree increment therefrom in a clockwise direction in Fig. 1 having ascending decimal significance. Thus each decimal designation (0 to 9) of the counting wheel is repeated 180° later. For each single tooth advance of the wheel in a clockwise direction in Fig. 1, a decimal one is added into the counter. For example, the value five is entered into the counting wheel by advancing it five teeth.

For advancing the counting wheel, there is provided a thin metal tape 13 of relatively small mass. The tape contains a series of nine openings 14 each of which is slightly larger than the cross sectional area of a tooth of the counting wheel. The spacing between adjacent openings in the tape is equal to the spacing between adjacent teeth of the counting wheel 10. The rearward end of the tape 13 is secured to a sector 16 which is pivotally mounted on a slide 17. A spring 18 connected between the sector and a stationary spring stud (not shown) continually spring loads the sector clockwise in Fig. 1 so as to urge the tape 13 to the left.

The slide 17 is mounted for vertical reciprocation relative to the counting wheel 10 by the engagement of a slot 19 near its lower end with a stationary pin 21, and by a suitable mounting means (not shown) near its upper end.

For reciprocating the slide 17, there is provided a cam 22 secured to a shaft 23 which is rotatably supported by suitably framed members (not shown). The shaft 23 is continuously rotated counterclockwise in Fig. 1 through mechanism (not shown) operatively linking it to a suitable driving motor. One complete cycle of operation of the counter is effected for each revolution (360°) of the shaft 23. Cooperating with the cam 23 is a pivotally mounted follower arm 25 having its one end operatively engaging a pin 26 extending from the top end of the slide 17. A spring 27 continuously biases the slide downward in Fig. 1 to maintain the pin 26 engaging the follower arm 25 and also to yieldably maintain the follower engaging the cam 22. It will be noted in Fig. 7 that the cam 22 contains three operational levels so that the slide 17 may be positioned in any one of three vertical positions, an extreme upward, a midposition, and an extreme downward position. At the beginning of each counter cycle, the slide is positioned in its extreme upward position. Thereafter, it is moved successively from the extreme upward position to the midposition, to the lower position, to the midposition, to the lower position and finally back to the extreme upward position at the end of the cycle.

When the slide 17 is in the midposition, the tape 13 is above the plane of the counting wheel 10 with the leading opening 14 (extreme right in Fig. 1) being directly above the uppermost tooth of the wheel.

During the time that the slide 17 is in either its mid or extreme upward position, a spring biased detent 29 which is pivotally mounted on the slide 17 engages the counting wheel to prevent accidental rotation thereof. It will be noted in Fig. 1 that an arm 30 of the detent is offset and normally abuts the edge of the slide 17 as indicated.

As the slide 17 moves into its lower position, the associated detent 29 is disengaged from the counting wheel 10 and the leading opening in the tape meshes the uppermost tooth of the counting wheel. Thereafter, the tape 13 is shifted to the right in Fig. 1 by mechanism to be later explained. The tape is shifted a number of units equivalent to the decimal value of the number to be entered in the counter. As the tape shifts, succeeding counterclockwise teeth of the wheel rotate momentarily into engagement with the corresponding aligned openings of the tape, so that the wheel is displaced clockwise by a number of teeth equivalent to the units of movement of the tape.

After the desired decimal value is entered in the counting wheel, the slide again shifts to its midposition to disengage the tape from the wheel 10. The tape then restores to the left to its normal position. Later in the machine cycle during so called carry time, the slide shifts downward to reengage the tape with the wheel. If a decimal carry is to be entered into this order counter from a lower order counter, the tape 13 is then shifted one unit to the right to add "one" into the counting wheel. The slide then shifts to its midposition again and the tape restores to the left in preparation for the next counter cycle.

In order to obtain an electrical indication of the position of the counting wheel so as to determine the decimal value in the counter, the following mechanism is provided. Insulatably secured to the shaft 11 near its rearward end is a spring wiper 31 which bears against the forward surface of the plate 12 as indicated in Fig. 1. Dependent upon the angular position of the shaft 11, the wiper 31 is adapted to electrically connect a common conductive insert 32 embedded in the plate 12 with any one of 10 arcuately arranged conductive inserts 34, also embedded in the plate 12. Each of the inserts 34 is representative of a particular decimal value, as indicated, corresponding to a corresponding angular displacement of the counting wheel. The 10 inserts 34 and the common insert 32 are distributed on the plate 12 so that for each single tooth advance of the counting wheel 10, the wiper 31 is advanced one numeric position.

Secured to the shaft 11 near its forward end is a so called 10's carry cam 35. Adapted for cooperation with the cam 35 is a follower 36 which is secured to a shaft 38, the latter being rotatably supported by the plate 12 and by the front frame member (not shown). A spring 39 connected between the follower 36 and a pivotally mounted latch 40 tends to maintain the follower engaging the cam 35. Secured to the shaft 38 near its rearward end is a bifurcated wiper 41 which normally has one fork thereof engaging a contact insert 43 in the plate while the other fork thereof is clear of a contact insert 44 as indicated in Fig. 1. The cam 35 contains two high dwells 45 at diametrically opposite points of the cam as indicated in Fig. 1. The cam is so arranged on the shaft 11 relative to the wiper 31 and the counting wheel 10 that as the counter wheel is advanced from a 9 to a 0 position, one of the high dwells of the cam engages the follower 36 to rock it and the associated shaft 11 clockwise from the position indicated in Fig. 1. This clockwise rocking of the shaft 11 shifts the wiper 41 so as to electrically connect the contact insert 43 to the insert 44 and precomplete a circuit over which a carry pulse is later directed to the succeeding higher order counter. This carry pulse effects a single unit movement of the related tape 13 in a manner to be explained, thus entering a carry into the associated counting wheel 10.

As the shaft 38 is rotated into the above described carry position, the spring biased latch 40 rotates counterclockwise to engage a step 47 of the follower thus "latching" the follower and its operatively connected wiper 41 in the 10's carry position. The follower and wiper remain latched in this carry position until the movement of the slide from its midposition to its extreme upward position at the end of each cycle engages a pin 48 secured to the slide with the latch 40 to rotate the latter clockwise in Fig. 1 and "unlatch" the follower 36. The follower is then free to reengage the cam 35 which results in the shaft 38 and its associated wiper 41 being restored to the position indicated in Fig. 1.

Secured to the rearward end of the shaft 11 is a second wiper 49 which bears against the rearward surface of the plate 12. This latter wiper is so arranged on the shaft 11 relative to the wiper 31 that when the wiper 31 is engaging the "9" insert 34 to indicate a 9 registered in that order counting wheel 10, the wiper 49 electrically connects two conductive inserts 50 and 51 embedded in the plate. The wiper 49 and the cooperating inserts 50 and 51 form part of a so called 9's extend carry circuit so that if a counter is standing at nine, a carry pulse into that counter from a lower order counter not only adds one into that counter, but extends the carry pulse to the succeeding high order counter to add a "carry" therein as arithmetically required.

All of the conductive inserts carried by the plate 12 terminate at the one edge thereof in related enlarged contact areas 53. Individual spring contacts (not shown) engage these areas so that electrical connection may be made between the plates 12 of each order of the counter or to other required circuitry external to the plates 12.

Numerical values are entered into the counter through the medium of perforated records. The records are rectangular in form and are divided vertically into parallel columns of data receiving areas, each column being divided into six spaced index points. Proceeding from the top of the card downwardly, the first 4 index points are designated 8, 4, 2 and 1, in accordance with a conventional 4 element binary code, while the last two index points are designated 0 and X and are known as control positions. The record cards are adapted to be used in companion machines wherein both the 0 and X positions may be perforated singly or in combination to effect certain operations. However, in the subject counter application, only the X control position is utilized. The presence of a perforation in the X position of the column in the record, which is to be sensed by a brush 54, signifies that the sign of the number represented in this record is negative. The absence of a perforation in this position signifies that the record number is positive in sign. A decimal number is represented in a particular column of the record, by perforating the numeric index points thereof singly or in combination as required by the value of the number. For example, a decimal seven is represented by perforating the 4, 2 and 1 index points of the desired column. The other decimal digits are similarly represented in the record by perforating the 4 index points of the desired column singly or in combination as indicated in the following table:

| Digit | Component Value | | | |
|---|---|---|---|---|
| | 1 | 2 | 4 | 8 |
| 1 | X | | | |
| 2 | | X | | |
| 3 | X | X | | |
| 4 | | | X | |
| 5 | X | | X | |
| 6 | | X | X | |
| 7 | X | X | X | |
| 8 | | | | X |
| 9 | X | | | X |

Numbers are entered into the counter by feeding perforated records successively, 8 index point first, between a sensing brush 54 and a contact roll 55 and thereafter between a line of sensing brushes 57 and a contact roll 58. The rollers 55 and 58 and associated brushes are electrically conductive and are adapted to electrically engage each other through perforations in the records to complete associated circuits in a manner to be explained. The records are advanced by conventional feed rollers (not shown) and the contact rolls 55 and 58, all the rollers being driven from the shaft 23 by suitable gearing. The rollers are spaced from each other a distance defined as one machine cycle which is the distance from a given point on one record to the corresponding point on the adjacent record as they pass through the feed rollers. Each 360 degree rotation of the shaft 23 effects one machine cycle.

As a record passes between the roller 55 and brush 54, the X index point position of the column aligned with the brush 54 is sensed to determine the sign of the number represented in that record. During the machine cycle thereafter, the numeric index points of the record are sensed by the brushes 57 and contact roll 58. Since a decimal number is represented in a record card in binary coded form while each counting wheel 10 is operated through the movement of the related tape 13 on a decimal increment basis, a translation of the binary coded card information must be provided. This translation is effected by a novel mechanical electrical arrangement in the counter as is hereinafter explained. Actually the 8, 4, 2, 1 binary coded card information is first translated in the counter to a 4, 2, 2, 1 binary-self-complementing code form, whereafter, the 4, 2, 2, 1 binary coded number is translated to effect a decimal increment movement of the counter set up tape 13. The intermediate state of the record number in the 4, 2′, 2, 1 self-complementing code form materially simplifies the entry of the 9's complement of the record number into the counting wheel to effect subtraction, when required.

As the 8, 4, 2 and 1 index points of a record move successively between the contact roll 58 and the brushes 57 at definite times in the machine cycle (see Fig. 7), the sensing of a perforation at any one of these index points in a particular column, effects the impulsing of an electro-magnet 59 of the related counter at corresponding times in the machine cycle. This energization of the magnet 59 is effected through a circuit to be later explained in detail. The magnet 59 and its associated armature 60 extend across the entire counter as shown in Fig. 1 with the armature being pivotally supported near its lower edge on a yoke 61 of the magnet. The upper end of the armature 60 extends through an opening in a plate 63 which is secured to the top of the magnet yoke 61. The opening in the plate permits an unobstructed movement of the armature 60 towards the magnet core and a limited restoration movement of armature away from the core under the urging of a suitable armature return spring (not shown).

Figure 2:
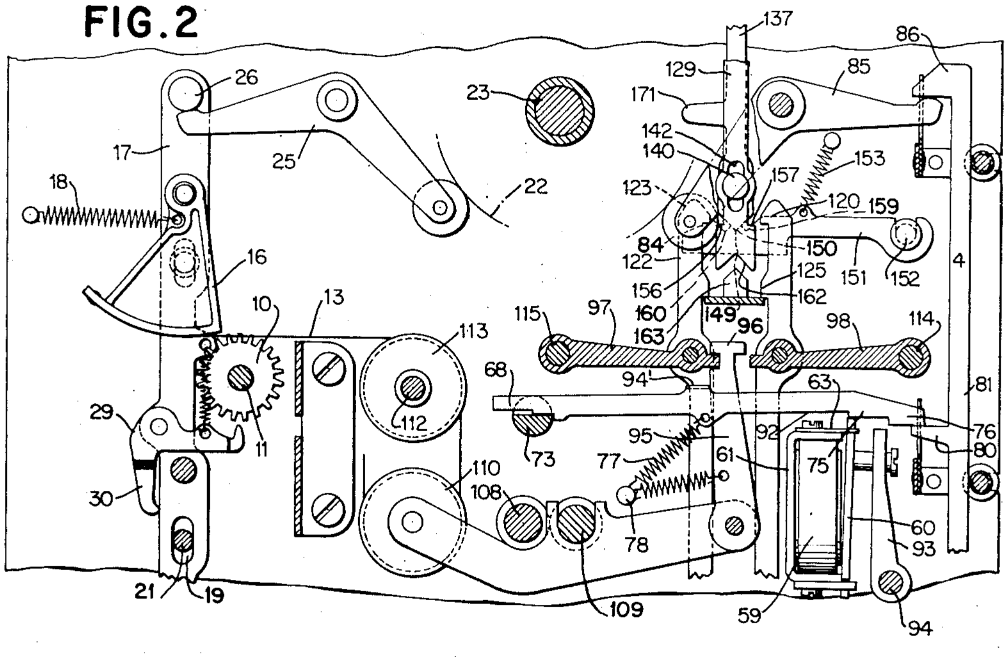
Fig. 2 is a partial vertical section view taken on the plane of the line 2—2 of Fig. 1.
Figure 3:
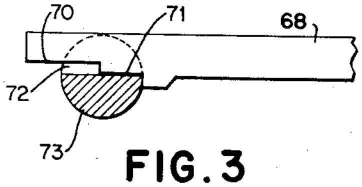
Fig. 3 is a partial vertical section view taken through the support shaft for the selector levers on the line 3—3 of Fig. 1 and shows the "2" selector lever in a normal position.

Extending laterally across the top of the armature 60, at spaced intervals, are four interposers, a so called "1" unit interposer 65, a "2" unit interposer 66, a "2′" unit interposer 67, and a "4" unit interposer 68. The left end of each interposer contains two step portions 70 and 71 and slidably engages a related slot 72 in a shaft 73 as best shown in Figs. 2 and 3. The shaft 73 is rotatably supported at its ends by suitable stationary frame members (not shown). The shaft 73 is normally positioned as indicated in Fig. 3 with the bottom of its mounting slots being horizontal. During counter reset time, the shaft 73 is rocked clockwise in Fig. 1 by mechanism to be later explained and for a purpose that will be later evident.

The right end of each interposer 65 to 68 also contains two step portions 75 and 76. A spring 77 connected between each interposer and a fixed shaft 78, continually urges each interposer to the left in Fig. 1. When the magnet 59 is unenergized, and its armature 60 is in the restored position, the spring 77 normally maintains each interposer in a position with the related step 71 engaging the bottom of its mounting slot 72 as indicated in Fig. 3, and the related step 75 engaging the end of the armature 60 as shown in Fig. 2. With an interposer in this position, the right hand end step 76 thereof, is supported by an extending arm 80 of an associated "4," "2," "2′" or "1" code bar 81 when the latter is positioned as shown in Fig. 2.

Each of the code bars 81 is mounted for vertical reciprocation in suitable stationary comb-like supports (not shown), each code bar being shown in its extreme upward position in Fig. 1. For reciprocating the "1" code bar 81, there is provided a cam 82 which is secured to the shaft 23 and is engaged by a roller 84 carried by one end of a pivoted follower 85. The other end of the follower 85 projects under and is engaged by the hooked upper end 86 of the "1" code bar 81. A spring 87 biases the "1" code bar continuously downward in Fig. 1 to maintain its hooked end 86 engaging the follower 85 and to maintain the roller 84 in engagement with the cam 82. In a similar fashion, the "2" code bar, "2′" code bar, and "4" code bar are reciprocated under the control of cams 88, 89 and 90, respectively, also carried by the shaft 23, the extending arm 80 of each code bar being adapted to engage the right hand end of the related interposer 65 to 68 when the code link is positioned in its upper position.

Referring to Fig. 7, it is seen that each of the code bars 81 shifts downwardly from the position indicated in Fig. 1 during particular times in the machine cycle. It will be noted that the code bars are shifted singly or in combination during the cycle in accordance with the movement of a record, index point by index point past the sense brushes 57. For example, when the 8 index point of a record is passing the sense brushes, the "4," "2′" and "2" code bars are moving downward simultaneously therewith. These 3 code bars in combination represent the decimal value 8 in coded form. Shortly thereafter, the "2′" and the "2" code bars restore upward so that as the "4" index point of a record is passing the sense brushes, only the "4" code bar is in its downward position. Similarly, at "2" and "1" sense time, only the "2" and "1" code bars, respectively, are in their downward position.

When an interposer is positioned as indicated in Figs. 1 and 3, the downward movement of the associated code bar 81 moves its extending arm 80 below the interposer so that the right end thereof, is supported solely by the armature 60 of the unenergized magnet 59. If the magnet 59 is then energized, the resultant counterclockwise rocking of the armature in Fig. 1 releases the associated interposers (65 to 68) which rotate clockwise around shaft 73 under the urging of its spring 77. The interposer rotates until the surface 92 thereof, engages the attracted armature 60. With the armature in this latter position, the step portion 76 of the interposer hooks over the upper end of a bail 93.

Figure 4:
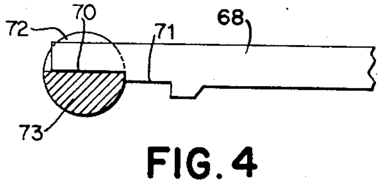
Fig. 4 is the same vertical section shown in Fig. 3 with the "2" selector lever being shown in a latched position.

The bail 93 which is pivotally mounted on a stationary shaft 94 rocks thereon during various times in the machine cycle. Bail 93 is shown in its extreme counterclockwise position in Figs. 1 and 2, with the interposer (65 to 68) in a position to be "hooked" thereon, upon energization of the magnet 59 plus a lowering of its corresponding code bar. With an interposer hooked on the bail 93, a later clockwise rocking of the bail, displaces the interposer towards the right. As the interposer shifts, its left end drops from step portion 71, as shown in Fig. 3, to step portion 70, as shown in Fig. 4. As a result, the interposer is "latched" in its shifted position.

As an interposer shifts toward the right in Figs. 1 and 3 as described above, an extending ear 94′ thereof engages an associated pivoted lever 95 and rotates it clockwise. As the lever 95 rotates, the left side of its T-shaped upper end 96 is disengaged from a subtract bail 97 while its right side is engaged with an add bail 98. Each lever 95 is pivoted to the one end of a related "1," "2," "2′" or "4" unit selector 100. The purpose of the four selectors 100 is later explained in detail.

After an interposer 65 to 68 has been shifted and latched in the position described above, the upward restoration movement of the related code bar 81, re-engages its arm 80 with the interposer and rotates the latter counter-clockwise around shaft 73. This rotation, however, does not disturb the "latched" position of the interposer, and the associated lever 95 remains hooked over the add bail 98.

The clockwise rocking of the bail 93 not only shifts the desired interposers into their latched position as described above, but also positively disengages the armature 60 from the then deenergized magnet 59. This is effected as follows: A pin 101 has its one end secured to the armature 60 and extends loosely through a suitable opening near the upper end of the bail 93. The pin has a head portion of larger diameter than the opening in the bail, this head portion being adapted for cooperation with the right hand surface of the bail in Fig. 1. If the armature 60 is held to the magnet core by residual magnetism after the magnet is deenergized, the latter part of the clockwise rocking of the bail engages it with the head of the pin and positively disengages the armature. Thereafter, the armature return spring (not shown) restores the armature in the normal manner.

For reciprocating the bail 93, there is provided a cam 102 which is secured to the shaft 23 and is engaged by a roller 103 carried by one end of a pivoted follower 105. The other end of the follower 105 is connected to the bail 93 by a link 106. The cam 102 contains a series of operational areas as indicated in Fig. 7 to effect reciprocation of the bail 93 in the manner previously explained.

After the last numeric index point (1) of the record is sensed by the brushes 57, the correct interposer or combination of interposers, as determined by the record perforations, are latched in their shifted position and the associated T-shaped levers 95 are hooked over the add bail 98. For example, if a record card is perforated in the 8 and 1 index points to represent the number 9, the sensing of the 8 perforation effects the shifting and latching of the "4," "2" and "2′" interposers 68, 67 and 66, respectively, while the sensing of the "1" perforation effects the shifting and latching of the "1" interposer 65. Consequently, all four T-shaped levers 95 which have a combined coded value of nine are engaged with the add bail 98.

As previously mentioned, each T-shaped lever 95 is pivotally mounted on one end of a related "1," "2," "2′" or "4" units selector 100, respectively, proceeding from the front of the counter towards the rear in Fig. 1. The four selectors are identical in size and differ only in that the "1," "2," and "2′" selectors are pivoted on a fixed shaft 108 and have identical lever arm distances between the shaft 108 and the pivotal mounting of the associated T-shaped lever 95, while the "4" selector is pivoted on a fixed shaft 109 (see Fig. 2) with the lever arm distance between the shaft 109 and the pivotal connection of its T-shaped lever 95 being less than the corresponding distance of the "1," "2" and "2′" selectors. Rotatably mounted on the left end of each "2," "2′" and "4" unit selectors 100 (Fig. 1) is a pulley or bobbin 110 which is adapted to receive the tape 13 as indicated. Rotatably mounted on a fixed shaft 112 arranged above the left end of the four selectors 100 of the counter unit are four spaced pulleys 113 similar to the selector pulleys 110. The forward end of the tape 13 is secured to the left end (Fig. 1) of the 1 unit selector 100 while the rearward end of the tape is secured to the sector 16 as previously explained.

Proceeding from the rearward end of the tape 13 towards the forward end, the tape passes over the rearmost pulley 113, the pulley 110 carried by the "4" units selector 100, the next to the rearmost pulley 113, the pulley 110 carried by the "2′" units selector, the next to the foremost pulley 113, the pulley 110 carried by the "2" units selector and finally over the foremost pulley 113 to the "1" unit selector 100. With the four selector levers 100 in their so called inoperative position as shown in Fig. 1, the extreme right hand opening 14 in the tape is directly above the uppermost tooth of the counting wheel 10.

It will be remembered that during the sensing of the numeric positions of a record card, the selected T-shaped levers, as determined by the card perforations, are engaged with the add bail 98. The add bail 98 is pivotally mounted at 114 to a suitable fixed shaft while the subtract bail 97 is similarly mounted at 115 to a suitable fixed shaft. During the latter part of the machine cycle, after the selected T-shaped levers are engaging the add bail 98, and if the counter entry value is positive, the add bail is rocked clockwise in Fig. 1 by mechanism to be explained.

As the bail rocks, the selected T-shaped levers are shifted therewith to effect a counterclockwise rotation of the associated selectors 100 around their pivotal mountings. The bail 98 is rocked clockwise through a fixed accurate angle so that the left end of each of the "1," "2" and "2′" selectors 100, if rotated, is displaced a distance equal to 1 unit of the tape 13. The left end of the "4" selector 100, if rotated, is displaced a distance equal to 2 units of the tape 113. This is a result of the previously explained difference in lever arm length of the "4" selector and the "2," "2′" and "1" selectors. The rotation of the "1" selector 100, through its previously mentioned operational connection with the tape 13, shifts the tape one unit towards the right in Fig. 1. However, the rotation of either the "2," "2′" or "4" selectors 100 shifts the tape 13 a number of units double the actual units of movement of the left end of the respective selector by reason of the loop connection of the tape over the associated pulley 110. The total units of displacement of the tape is the arithmetic sum of the displacements effected by the rotation of the individual selectors. As explained previously, the slide 17 is positioned in its lowered position so as to engage the tape 13 with the counting wheel 10 prior to the shifting of the tape by the selectors. Consequently, the shifting of the tape displaces the counting wheel clockwise a number of units or teeth equal to the decimal value of the coded number in the sensed record card.

If the number represented in a particular record card is negative, the subtract bail 97 is operated rather than the add bail 98. The operation of the subtract bail effects a rotation of any selector 100 which has its T-shaped lever 95 still engaged therewith at the end of the record sense portion of the counter cycle. Since T-shaped levers which remain on the subtract bail represent the 9's complement of the value represented in the previously sensed record, by reason of the self-complementing 4, 2, 2′, 1 code, the operation of the subtract bail effects a displacement of the counter tape and counting wheel a number of units equal to the 9's complement of the record card value. Thus subtraction is effected in the counter by the well known 9's complementing method.

As explained above, the entry of the record card value into the counting wheel in either a true number form or a 9's complement form is dependent upon whether the add bail 98 or the subtract bail 97, respectively, is operated during the latter part of the counter cycle. The selective operation of bail 97 or 98 is determined by the sensing by brush 54 of the X index point in the aligned column of the record. As stated previously, this X index point is perforated in records representative of a negative number while positive number records contain no such perforation. If an X perforation is sensed by the brush 54, a subtract magnet 117 of the counter is energized during the latter part of the following machine cycle after the numeric index point of the record has been sensed by brushes 57. The energization of the subtract magnet effects an operation of the subtract bail 97 in a manner to be explained. If the record card is not perforated in the X position, an add magnet 118 of the counter is energized during the latter part of the following machine cycle. The energization of the add magnet effects an operation of the add bail 98 in a manner also to be explained.

Referring to Figs. 1 and 2, it is noted that a member 119 having a hooked upper end 120 is pivotally secured at its lower end to the add bail 98. A similar member 122 having a hooked upper end 123 is pivotally secured at its lower end to the subtract bail 97. The members 119 and 122 occupy the same vertical plane and have their hook ends extending towards each other as indicated. A spring (not shown) connected between fixed structure and the lower end of member 119 maintains it in a vertical position as indicated, and also maintains an ear 125 of the member normally seated against a stationary abutment 127 to accurately position the member and its associated add bail 98. A similar spring serving the same purposes is provided for member 122.

Extending vertically in the same plane as the members 119 and 122 is an interposer 129 which is pivotally attached at its upper end to a cam follower 131. A spring 132 continually urges the follower in a clockwise direction around a fixed mounting shaft 133 so as to maintain an associated roller 134 in continuous contact with a cam 136 carried by shaft 23. Arranged parallel to the interposer 129 is a three armed lever 137 which is pivoted at its upper end to a fixed stud shaft 138. A pin 140, carried by the lower arm 141 of the lever 137, slidably engages a vertically extending slot 142 in the interposer. The cam 136 contains operational dwells as indicated in Fig. 7 and is adapted to reciprocate the interposer 129 vertically relative to lever 137 from approximately 187° to 276° of the machine cycle and again from approximately 282° to 333° of the machine cycle, the latter reciprocation being only ¼ the distance of the former as the contour of the high dwells in Fig. 7 indicates. Interposer 129 is shown in its normal downward position in Fig. 1. An arm 144 of the lever 137 operationally engages the armature 145 of the subtract magnet 117 which is secured to stationary structure (not shown). In a similar manner, an arm 146 of the lever 137 operationally engages the armature 147 of the add magnet 118.

With both magnets 117 and 118 unenergized, the lever 137 is positioned as indicated in Fig. 1 with a pointed end 149 of its lower arm 141 engaging a middle notch 150 of a detent 151. This is a so called neutral position of the interposer 129 and lever 137. The detent 151 is pivoted at 152 to stationary structure and is continuously urged clockwise in Fig. 1 by an associated spring 153. With the interposer in the neutral position, its vertical reciprocation path is such that there is no possibility of the engagement of integral latch ledges 156 and 157 thereof with the adjacent hooked ends of members 122 and 119, respectively.

Upon energization of the add magnet 118 (subtract magnet 117 unenergized), the arm 137 pivots counterclockwise in Fig. 1 until its lower end 149 engages the right hand notch 159 of the detent 151. This is a so called add position of lever 137. With the lever in this position, the operatively connected interposer 129 is positioned with its latch ledge 157 below the hooked end of the member 119. Consequently, as the interposer 129 moves upward at 187° in the machine cycle, the member 119 hooks thereon and the associated add bail 98 is rotated clockwise in Fig. 1. The clockwise rocking of add bail 98 enters a true number value into the counter in the manner previously explained.

If the subtract magnet 117 is energized (add magnet unenergized), the arm 137 pivots clockwise in Fig. 1 until its lower end 149 engages the left hand notch 160 of the detent 151. This is a so called subtract position of lever 137. With the lever 137 in this position, the operatively connected interposer 129 is positioned with its latch surface 156 below the hooked end of member 122. Consequently, as the interposer moves upward at 187 degrees, in the machine cycle, the member 122 hooks thereon and the associated subtract bail is rotated counterclockwise in Fig. 1. This counterclockwise rocking of the subtract bail enters a 9's complement value into the counter in the manner previously explained.

It will be noted in Fig. 7, that on a downward restoration movement of the interposer 129, the interposer actually overthrows slightly below its normal restored position. This overthrow action positively engages a notched lower end 162 of the interposer with a fixed cam member 163 to positively restore the interposer and the associated lever 137 to the neutral position shown in Fig. 1.

Figure 5:
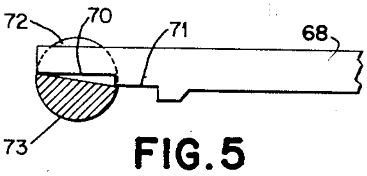
Fig. 5 is the same vertical section shown in Fig. 3 with the support shaft being shown in a position which permits a "latched" selector lever to restore to its normal position.

Simultaneously, with the above restoration movement of the lever 137 and interposer 129, the shaft 73 rocks clockwise from the position indicated in Fig. 4 to the position indicated in Fig. 5. As the shaft rocks to this latter position, the now inclined position of the normally horizontal bottom of the mounting slot 72 for each interposer 65 to 68 permits each "latched" interposer to restore to the left in Fig. 1 under the urging of the associated spring. As each "latched" interposer restores, the associated T lever 96 is permitted to rotate counterclockwise to reengage the subtract bail 97. Thereafter, the shaft 73 restores counterclockwise and the step 71 of each interposer again engages the horizontal bottom of its mounting slot 72, as shown in Fig. 3. After the above operation, the T-shaped levers of all four interposers 65 to 68 are again engaging the subtract bail which is their normal position. The counter mechanism is now in condition for a possible carry operation which is later explained.

For rocking the shaft 73, there is provided a cam 165 which is engaged by a roller carried on one end of a pivoted follower 166. Fixed to the shaft 73 near its forward end is an arm 167 which is operationally connected to the follower 166 by a connecting link 169. A spring 170 connected between a stationary spring stud (not shown) and the lower end of link 169, urges the follower clockwise to maintain it in continuous engagement with the cam 165.

At approximately 263° in the counter cycle, a carry pulse is applied to the magnet 59 if there is to be a carry into that counter position. At this time, the "4" code bar 81 is shifting downward so as to release the associated "4" interposer 68. Consequently, the energization of the magnet 59 permits the "4" interposer to be hooked over the bail 93. Thereafter, the bail 93 is operated in the manner previously explained, which results in T-shaped lever 95 of the "4" selector 100 being engaged with the add bail 98. Referring again to Fig. 1, it is noted that extending laterally from the lower arm 141 of lever 137 is a finger 171 which bears against a cam 172 carried by the shaft 23. Simultaneously with the above described action, the engagement of a high dwell (Fig. 7) of the cam 172 with the finger 171 displaces the lever 137 counterclockwise in Fig. 1 into its so called add position. This action positions the associated interposer 129 with its latch ledge 157 beneath the hook member 119. Thereafter at 282° of the countercycle, the cam 136 moves the interposer 129 upward and the add bail 98 is displaced clockwise in Fig. 1. This high dwell of the cam 136 is of such a height, however, that the add bail 98 is rocked clockwise only ¼ the usual distance. Consequently, the resultant operation of the "4" selector 100 displaces the tape 13, which is again engaging the counting wheel 10, only 1 unit rather than its usual 4 units. Thus the desired decimal carry into the counter is effected. By using the "4" selector as a carry medium in the manner explained above, the add bail 98 need only be rocked through ¼ of its usual arc and the machine time required for the carry operation is held to a minimum. After the carry operation, the interposer 129 and the latched "4" selector 100 are restored in the usual manner and the counter is in condition for the next machine cycle.

Although there is only 1 counter unit shown in Fig. 1, a plurality of such counter mechanisms may be stacked vertically so as to obtain a multi-order counter. In such a multi-order counter, there need be only 1 group of control cams and one subtract magnet 117 and add magnet 118 for the entire counter, since the slide 17, the link 169, the hook members 119 and 122, the code bars 81, and the link 106 may be extended vertically so as to accommodate all the counter units.

Referring to Figs. 6 and 6A, there is shown a diagrammatic circuit representation of four of the subject tape counters connected in cascade so as to form a 4 order counter. Required control circuitry, as indicated, is also provided so as to effect a complete 4 order accumulating machine. Each of the contacts labeled CR1 to CR25 are closed during specific intervals of the machine cycle, as indicated in Fig. 7, by an associated cam which is operatively connected to the shaft 23 by suitable mechanism (not shown). The purpose of each of these contacts will be later explained. It is also noted in Fig. 6 that each of the brushes 57 is further labeled with a particular letter *a*, *b*, *c* and *d*. The brush 57*a* is adapted to sense the column of a record in which the units order of the number in the record is represented. Similarly, the brush 57*b* senses the tens order representation column, etc. Each brush 57*a* to *d* is connected to a corresponding units, tens, hundreds and thousands order counter, respectively. The wiper 41 and contact areas 43 and 44 forming a so called 10's contact for each counter are designated with the reference numeral 180 in Figs. 6 and 6A. Similarly the wiper 49 and its associated contact areas 50 and 51 forming a so called 9's contact for each counter are designated with the reference numeral 181. For ease of reference, the 9's contact 181 and 10's contact 180 associated with each of the units, tens, hundreds, and thousands order counters are further labeled with a suffix letter *a*, *b*, *c* and *d* respectively.

It is believed that understanding of the operation of the accumulating machine and its allied circuitry will be facilitated by following its operation in accumulating some representative numerical values. For example, assume that a first record card is perforated to represent +54, a second record card to represent +27 and a third record card to represent −16, it being desired to accumulate these values to give a sum of 65. The record cards are, of course, perforated in corresponding columns which are chosen so as to coincide with the units brush 57*a* and tens brush 57*b*. The third record is identified as containing the negative value −16 by a perforation in the X index point position of its thousand order column which is to be sensed by brush 54 and brush 57*d*. The corresponding X index point position of the first and second records remain unperforated, since these cards represent positive values. It will be assumed that prior to the counter operation, each counter has been reset to its 9 position as indicated in Figs. 6 and 6A in a manner that will be later explained.

*First machine cycle*

During the first machine cycle, the first record (perforated to represent +54) is advanced 8 index point first, between the contact roll 55 and brush 54. At X sense time, the brush 54 finds no X perforation in this record so its associated circuit is not activated. At approximately 335 degrees of this first machine cycle, the closing of cam contact CR18 completes a circuit from a positive power line 182, through contact CR18, the normally closed side of a contact R1*a* of a reset relay R1, the normally closed contact R6*g* of a read out relay R6, the normally closed side of a contact R3*a* of a relay R3 and finally through the add magnet 118 and a parallel counter entry control relay R4 to a negative power line 183. The energization of the add magnet 118 positions the latch ledge 157 of the interposer 129 under the hook member 119 associated with the add bails 98 of the 4 order counter. The energization of the entry control magnet R4 causes its associated contacts R4*a* to close and its contacts R4*b* to R4*e* to transfer. The closing of the contact R4*a* completes a circuit from the power line 182, through cam contact CR17, now closed, and the hold coil of relay R4 to the power line 183. The counter entry relay R4 is held energized through cam contacts CR17 until 153° of the following machine cycle. The transferred contacts R4*b* to R4*e* control entry of the value (+54) represented in the first record card into the accumulating machine during the first part of the second machine cycle in a manner to be explained.

*Second machine cycle*

During the second machine cycle, the first record card advances between the brushes 57 and contact roll 58 while the second record card (perforated to represent +27) advances between the brush 54 and the contact roll 55. As the perforation in the four index point of the first record is engaged by the units order brush 57*a* (34 degrees), a circuit is completed from the power line 182, through cam contact CR23, now closed, card lever contact CLC1, which is closed during the passage of a record between the roll 58 and brushes 57, common brush 185 which continually engages the roller 58, the contact roll 58, the units order brush 57*a*, the associated conductor 187, the normally closed side of contact R1*f* of relay R1, the contacts R4*e*, now transferred, and finally the units order counter magnet 59 to the power line 183. Referring to Fig. 7, it is noted that the energization of the counter magnet 59 at this time in the counter cycle effects an operation of the associated "4" interposer 68 which in turn engages the related T lever 95 of the "4" selector 100 with the add bail 98 of the units order counter. At the same time that the units order brush 57*a* senses the perforation on the 4 index point of the units column of the first record, the tens order brush 57*b* senses a perforation in the 4 index point of the tens order column of that record. This effects the same action in the tens order counter as was described above for the units order counter.

At 102° in the second machine cycle, as the perforation in the 1 index point of the first record is engaged by the tens brush 57*b*, a circuit is completed from the power line 182, through cam contact CR23, now closed, card lever contact CLC1, common brush 185, the contact roll 58, the tens order brush 57*b*, the associated conductor 188, the normally closed side of contacts R1*e* of relay R1, the contacts R4*d*, still transferred, and finally the tens order counter magnet 59 to the power line 183. Referring to Fig. 7, it is noted that the energization of the counter magnet 59 at this time in the counter cycle effects an operation of the associated "1" interposer 65 which in turn engages the related T lever 95 of the "1" selector 100 with the add bail 98 of the tens order counter. Thus, at the end of numeric sense time of the second cycle, the T levers 95 of the "4" and "1" selectors 100 of the tens order counter and the T lever of the "4" selector of the units order counter are engaging their respective add bail 98. At X sense time in the second machine cycle, (170°) the brush 54 finds no X perforation in the second record card so its associated circuit is not activated in this cycle.

At approximately 187° in the second machine cycle, the cam 136 lifts the interposer 129 upward from the lower position indicated in Fig. 1. It will be remembered that the interposer was previously positioned in its add posidtion. Consequently, the upward movement of the interposer operates the "4" and "1" selectors of the tens order counter and the "4" selector of the units order counter. The operation of the "4" and "1" selectors of the tens order counter advances that counter 5 units, from its 9 reset position, through its 0 position, to its 4 position. As the counter advances through its 0 position, the associated 10's contact 180*b* is latched closed in the manner previously explained in detail. The operation of the "4" selector of the units order counter advances that counter 4 units, from its 9 reset position, through its 0 position, to its 3 position and also latches its associated 10's contact 180*a* in a closed position. There is no operation of the hundreds and thousands order counters at this time. Consequently, after the above described operations, the accumulating machine indicates the value 9943. Shortly thereafter, the selectors 100, add bails, etc., restore in the usual manner in preparation for a carry operation.

At approximately 263 degrees in the second machine cycle, the closing of cam contact CR11 completes a carry circuit from the power line 182, through cam contact CR11, the now closed 10's contact 180*a* of the units order counter, the normally closed side of the contacts R4*d*, now closed as relay R4 is unenergized at this time, and finally through the tens order counter magnet 59 to the power line 183. The carry circuit is also applied through the now closed 10's contact 180*b* of the tens order counter, the normally closed side of the contacts R4*c* and the hundreds order counter magnet 59 to the power line 183. Since both the hundreds and thousands order counters are registering 9 and their respective 9's contacts 181*c* and *d* are accordingly closed, the carry circuit is also extended firstly through the 9's contact 181*c*, the normally closed side of contacts R4*b* and the thousands order counter magnet 59 to the power line 183; and secondly, through a conductor 190, the 9's contact 181*d*, and the units order counter magnet 59 to the power line 183.

Referring to Fig. 7, it is noted that the energization of the units, tens, hundreds and thousands order counter magnets 59 at this time in the machine cycle, effects an engagement of the T lever 95 of the four selector 100 associated with each counter with the associated add bail 98. Referring again to Fig. 7, it is seen that at approximately 265 degrees in the machine cycle, a high dwell of the cam 172 engages the finger 171 of the lever 137 and rotates it into the add position. Thereafter, at approximately 282 degrees in the cycle, the cam 136 rocks the add bails 98 of the four counters through ¼ of their normal operational arc. This rocking of the add bails displaces the T levers of the associated four selectors 100 engaged therewith and enters a one or carry into each of the four counters. The entry of a carry into each counter advances that counter as indicated below and the desired value of +54 as represented in the first record card is now registered in the accumulating machine.

| | |
|---|---|
| 9943 | counters prior to carry |
| 1111 | carry |
| 0054 | counters after carry |

After the above operations, the selector levers 100, the add bails 98, the latched tens contacts 180, etc., restore in their usual manner.

At approximately 335 degrees of the second machine cycle, the closing of contact CR18 again energizes the counter entry relay R4 and the add magnet 118 in the same manner as described in the first machine cycle. The energization of these magnets effects the same actions as before.

*Third machine cycle*

During the third machine cycle, the second record card advances between the brushes 57 and the contact roll 58 while the third record card (perforated to represent −16) advances between the brush 54 and the contact roll 55. At 34° in the third machine cycle, as the four perforation in the units order column of the second record moves under the units brush 57*a*, a circuit is completed in the same manner previously described to impulse the magnet 59 of the units order counter. This results in the T lever 95 of the associated "4" selector 100 being engaged with the associated add bail 98. Thereafter, at 68° in the third machine cycle, the sensing of the perforations in the 2 index point position of the units and tens columns of the second record effects in a similar manner the engagement of the T levers 95 of the associated "2" selectors 100 with their respective add bails 98. At 102 degrees in the third machine cycle, the sensing of the perforations in the 1 index point position of the units column of the second record effects the engagement of the T lever of the associated "1" selector with the units counter add bail 98. Thus at the end of numeric sense time of the third machine cycle, the T levers 95 of the "4," "2," and "1" selectors 100 of the units order counter, and the T lever 95 of the "2" selector 100 of the tens order counter are engaging their respective add bails 98.

As the X perforation in the third record moves under the brush 54 at 170 degrees in the third machine cycle, a circuit is completed from the power line 182, through a cam contact CR22 (now closed), a card lever contact CLC2, which is closed during the passage of a record between the roll 55 and brush 54, a conductor 191, and finally through the relay R3 to power line 183. The energization of relay R3 causes its associated contacts R3*b* to close and contacts R3*a* to transfer. The closing of contacts R3*b* completes a circuit from the power line 182, through cam contact CR19, contacts R3*b*, and a hold coil of the selector relay R3 to the power line 183. The relay R3 is held energized through cam contact CR19 until the end of the third machine cycle.

At 187 degrees in the third machine cycle, the cam 136 lifts the interposer 129 upwards and effects the operation of the add bails 98 of the four counters. This operation of the add bails, in turn, operates the "4," "2," and "1" selectors 100 of the units order counter and the 2 selector 100 of the tens order counter. This action results in the value 7 being entered into the units counter and the value 2 being entered into the tens order counter.

Since the units order counter previously contained 4, the entry of 7 therein "rolls" the counter through its zero position to its 1 position. The entry of the value 2 into the tens order counter, which previously contained five, advances this counter to 7. As the units order counter rolls through zero, its associated tens contact 180*a* is latched in the carry position in the manner previously explained in detail. With the accumulating machine now indicating the sum 0071 which is ten below the desired result, the selectors 100, add bails 98, the interposer 129 and lever 137 restore in the usual manner in preparation for a carry operation.

At approximately 263 degrees in the third machine cycle, the closing of cam contact CR11 completes a circuit from the power line 182, through cam contact CR11, the 10's contact 180*a* of the units order counter, the normally closed side of the contacts R4*d*, now closed as relay R4 is unenergized at this time, and through the tens order counter magnet 59 to the power line 183. The energization of the tens order counter magnet results in a carry or one being entered into that counter in the manner previously explained in detail. After the above action, the accumulating machine indicates the sum 0081 which is the desired result at this point in the operation. Thereafter, the "4" selector 100 of the tens order counter and its associated mechanism, the add bails 98, the latched tens contact 180*a*, etc., restore in the usual manner.

At approximately 335 degrees of the third machine cycle, the closing of cam contact CR18 completes a circuit from the power line 182, through cam contact CR18, the normally closed side of the contacts R1*a*, the normally closed contacts R6*g*, the contacts R3*a*, now transferred, and finally through the subtract magnet 117 and the paralleled pick up coil Pu of the counter entry relay R4 to the power line 183. The energization of the subtract magnet 117 positions the latch ledge 156 of the interposer 129 under the hook member 122 associated with the four add bails 98 of the four order counter. The energization of the counter entry relay R4 causes its associated contacts R4*a* to close and contacts R4*b* to R4*e* to transfer. The closing of contacts R4*a* again completes a circuit from the power line 182 through cam contact CR17, now closed, and the hold coil of relay R4 to the power line 183. The counter entry relay R4 is held energized through cam contact CR17 until 153° of the following machine cycle.

*Fourth machine cycle*

During the fourth machine cycle, the third record card (−16) advances between the brushes 57 and contact roll 58. At 34 degrees in this cycle as the perforation in the 4 index point of the third record is engaged by the tens order brush 57*b*, a circuit is completed, as previously explained in detail to energize the magnet 59 of the units order counter. The energization of magnet 59 at this time results in the T lever 95 of the associated "4" selector 100 being engaged with the units order add bail 98. At 68 degrees of this cycle, the sensing of the 2 index point perforation by the units order brush 57*a* similarly effects the engagement of the T lever 95 of the associated "2" selector 100 with the units order add bail 98. Thereafter, at approximately 102 degrees in the cycle, the sensing of the 1 index point perforation by the tens order brush 57*b* effects the engagement of the T lever 95 of the associated "1" selector 100 with the tens order add bail 98. Thus at the end of numeric sense time of the 4th machine cycle, the T levers of the "4" and "2" selectors of the units order counter are engaging the associated add bail 98 while the T levers of the "2" and "1" selectors of this counter are still engaging the associated subtract bail 97. In the tens order counter, the T lever of the "1" selector is engaging the tens order add bail 98 while the T levers of the associated "4," "2′" and "2" selectors are engaging the tens order subtract bail 97. In the hundreds and thousands orders counters, the T levers of the related "4," "2," "2′" and "1" selectors are all engaging the related subtract bail 97.

At approximately 187 degrees in the fourth machine cycle, the cam 136 lifts the interposer 129 upward from the lower position indicated in Fig. 1. It will be remembered that the interposer was previously positioned in its subtract position. Consequently, the upward movement of the interposer rocks all the subtract bails 97 of the four order counter. The rocking of the units order subtract bail 97 operates the "2′" and "1" selectors linked therewith to enter the value 3 into this counter. Since this counter already contains 1, the further entry of 3 therein advances the counter to its 4 position. The rocking of the tens order subtract bail operates the "4," "2," and "2′" selectors engaged therewith to enter the value 8 into the tens order counter. Since this counter contained 8 prior to this operation, the entry of 8 more therein rolls the counting wheel through zero to its six position. As the counter rolls through zero, the associated tens contact 180*b* is latched in its operative position. The rocking of the hundreds and thousands order subtract bails 97 operates the respective "4," "2," "2′" and "1" selectors engaged therewith, to enter the value 9 into each of these counters. By the above operations, the 9's complement of the record card value 16 has been entered into the accumulator. With the accumulating machine now indicating the sum 9964, the selectors 100, subtract bails 97, and the interposer 129 and lever 137 restore in the usual manner in preparation for the carry operation.

At approximately 263 degrees in the fourth machine cycle, the closing of cam contact CR11 completes a circuit from the power line 182, through cam contact CR11, the 10's contact 180*b* of the tens order counter, the normally closed side of the contacts R4*c*, now closed as relay R4 is unenergized at this time, and through the hundreds order counter magnet 59 to the power line 183. Since the hundreds order counter is registering 9 at this time, and its 9's contact 181*c* is accordingly closed, the carry circuit is extended from the contacts R4*c*, through the 9's contact 181c, the normally closed side of the contacts R4*b*, and through the thousands order counter magnet 59 to the power line 183. Since the thousands order counter is also registering 9 at this time and its 9's contact 181d is accordingly closed, the carry circuit is further extended from the contact R4*b* through conductor 190, the 9's contact 181d, the normally closed side of the contacts R4*e*, and through the units order counter magnet 59 to the power line 183. The energization of the units, hundreds and thousands order counter magnets 59 at this time effects the entry of a one or carry into each of the related counters in the manner previously explained in detail. The entry of 1 into the units counter advances it from four to five, the tens order counter remains at 6, the entry of 1 into the hundreds order counter advances it from 9 to zero, and the entry of 1 into the thousands order counter advances it from 9 to zero. The accumulating machine is now registering the sum 65 which is the desired result of +54+27−16.

During the latter part of this fourth machine cycle, the selectors 100, add bails 98, interposer 129, and lever 137, latched tens contacts 180b etc., are restored in their normal manner in preparation for the next counter cycle. The entire operation of the accumulating machine in achieving the desired total +65 is recapitulated in schematic form below.

| | | |
|---|---|---|
| 1st counter operation | 9999 | reset counter. |
| | 9943 | 54 enters counters. |
| | 1111 | carry operation. |
| | 0054 | counter at end of first accumulate operation. |
| 2nd counter operation | 0027 | 27 enters counter. |
| | 0071 | counter after entry of 27. |
| | 0010 | carry operation. |
| | 0081 | counter at end of second accumulate operation. |
| 3rd counter operation | 9983 | −16 enters counter. |
| | 9964 | counter after entry of −16. |
| | 1101 | carry operation. |
| | 0065 | counter at end of third accumulate operation. |

*Counter read-out*

When desired, the total standing in the accumulating machine may be read out and punched into a record card in the same binary coded form as utilized in reading values into the accumulator. The total record card is identical in size and form to the previously described read in cards so that the total records themselves may be used at some future time to read values into the accumulator, if desired. A machine (not shown) for punching the records is adapted to advance the total record laterally, 8 index point position first, under a line of electromagnet controlled punches. A punch is provided for each column of the record and an electromagnet 194 controlling the punch is electrically linked to the related counter as indicated in Fig. 6A. The card feed advancing means of the punch are operatively linked to and timed with the driven shaft 23 of the counter by any suitable mechanism (not shown) so that the 8, 4, 2, 1, 0 and X index positions of the record are successively positioned under the line of punches during the 8, 4, 2, etc., read-in time, respectively, of the counters.

The counter read out operation will be explained by reading out the previously accumulated sum of +65. With 0065 registered in the counter, the thousands order wiper 31 is positioned to interconnect its common insert 32 with its zero insert 34, the hundreds order wiper 31 is positioned to interconnect its common insert with its zero insert, the tens order wiper is positioned to interconnect its common insert with its six insert, and the units order wiper is positioned to interconnect its common insert with its five insert. Counter read out initiated by closing a read out key contact 195. With contact 195 closed, the closing of cam contact CR12 at 300° in the cycle preceding the actual read out cycle completes a circuit from the power line 182, through contact CR12, through key contact 195, the normally closed side of contacts R5*b* of an interlock relay R5, through the pick up coil of a read out relay R6 to the power line 183. The energization of the read out relay R6 causes its contacts R6*a* to *f* to close and its contacts R6*g* to open. The read out relay R6 is a latch type relay which maintains its associated contacts R6*a* to *g* in the above operative positions after CR12 opens and denergizes its pick up coil. The contacts R6*a* to *g* remain latched in their operative position until the closing of cam contact CR14 at 284° in the next machine cycle, energizes a latch trip coil LT of relay R6.

At 315° in the cycle preceding the actual read out cycle, the closing of cam contact CR13 completes a circuit from the power line 182, through cam contact CR13, the normally open contacts R6*f*, now closed, interlock relay R5 to the power line 183. The energization of relay R5 causes its associated contacts R5*a* and *b* to transfer. The interlock relay R5 is held energized through its contacts R5*a* and closed R. O. key contact 195 until the R. O. key contact is released. As long as the interlock relay R5 is energided and its contact R5*a* is transferred, it is impossible for a pulse from CR12 to reenergize the pick up coil of the R. O. latch relay R6. It is evident, therefore, that the interlock relay R5 and its associated contacts R5*a* and *b* prevent energization of the read out relay R6 in successive machine cycles if the key contact 195 is held continuously closed. This action prevents accidental successive cycles of read out of the counter total. When successive read out cycles are desired, it is necessary to depress and release the key contact 195 for each read out cycle desired.

At 317° in this cycle preceding the actual read out cycle, the cam contact CR15 completes a negative balance test circuit from the power line 182, through contact R6*a* to the 9's contact 49 of the highest (thousands) order counter of the machine. This 9's contact 49 is open since the related counter is indicating zero and as a result, an inversion relay R7 remains unenergized and the read-out operation proceeds in its normal manner. If the sum in the accumulating machine was negative, it would be represented in the machine in 9's complement form and the thousands order 9's contact 49 would be closed. In this latter case, the negative balance test circuit would be completed to energize inversion relay. The energization of the relay R7 would effect an inversion of the accumulator sum so that the punched total record would be in true number form. This read out and inversion will be later explained with a specific example.

Returning again to our example, the closing of cam contact CR18 at 335° in this machine cycle has no effect on the counter entry magnet R4 since the contact R6*g* is open at this time. With magnet R4 unenergized, its associated contacts R4*a* to *e* remain as shown in Fig. 6A.

At 4 time (34°) in the next machine cycle, which is the actual read out cycle, the closing of cam contact CR6 momentarily completes a circuit from the power line 182, through cam contact CR6, the normally closed contacts R7*h* of the inversion relay R7, a conductor 197, the 5 insert 34 of the units order counter, the units order wiper 31, the related common insert 32, the normally open side of read out contact R6*e*, now closed, a conductor 198, and finally through the punch magnet 194 for the units order punch device to the power line 183.

Simultaneous with the above circuit, the closing of cam contact CR7 momentarily completes a circuit from the power line 182, through cam contact CR7, the normally closed contact R7*i*, a conductor 199, the 6 insert 34 of the tens order counter, the tens order wiper 31, the related common insert 32, the normally open side of read out contact R6*d*, now closed, a conductor 200, and finally through the punch magnet 194 for the tens order punch device to the power line 183.

At 2 time (68°), the cam contact CR7 again closes and completes the same circuit described above to again impulse the magnet 194 of the tens order punch device. In a similar fashion, the closing of cam contact CR6 at 1 time (102°) again impulses the magnet 194 of the units order print device.

At 0 time (136°) in the read out cycle, the closing of cam contact CR1 completes a circuit from the power line 182, through cam contact CR1, the normally closed contacts R7*c* of the inversion relay R7, the 0 insert 34 of the thousands order counter, the associated wiper 31, the related common insert 32, the normally open side of contacts R6*b*, now closed, and finally through the control magnet 194 of the thousands order punch device to the power line 183. The closing of cam contact CR1 also completes a parallel circuit through the 0 insert 34 of the hundreds order counter, through the associated wiper 31, the related common insert 32, the normally open side of contact R6*c*, now closed, a conductor, and finally through the control magnet 194 of the hundreds order punch device to the power line 183.

As a result of the pulsing of the magnet 194 of the units order punch device at 4 and 1 time, the associated punch device is actuated to effect punching of the 4 and 1 index positions of the units order column of the total record. Similarly, the pulses applied to the tens, hundreds, and thousands order punch magnets 194 effects the punching of the 4 and 2 index positions of the related tens order column of the total record and a punching of the 0 position of the hundreds and thousands order columns. As a result, a total card representative of the accumulator sum 0065 is obtained. The 0 positions of the hundreds and thousands order columns are punched to give a positive zero indication in these columns for a visual examination of the card. If this total card is now used to read a value back into the accumulator, the 0 perforations have no effect on the machine.

*Negative balance read out*

Returning now to a read out operation wherein the sum is negative, assume a sum of −65 in the counter. This is actually represented in the counter in 9's complement form as 9934 so that the thousands order wiper is engaging its 9 insert 34, and the hundreds, tens and units order wipers are engaging their 9, 3 and 4 inserts 34 respectively.

As before, the closing of key contact 195 permits cam contact CR12 to energize the relay R6 at 300 degrees in the cycle preceding the actual read out cycle. Also, the closing of cam contact CR13 at 313 degrees in this cycle energizes the interlock relay R5 as before. At 315 degrees, however, the closing of cam contact CR15 completes a circuit from the power line 182, through read out contact R6*a*, now closed, the 9's contact 49 of the thousands order counter, which is now closed as a 9 is registered in this counter, and finally through the inversion relay R7 to the power line 183. The energization of the inversion relay R7 causes its contacts R7*a* and *m* to close, and its contacts R7*b* to R7L to transfer. The closing of the contact R7*a* completes a hold circuit for the inversion relay from the power line 182, through cam contact CR16, the contacts R7*a*, a hold coil of relay R7 to the power line 183. Relay R7 is held energized through cam contact CR16 until 153° of the next cycle which is the actual counter read out cycle. With the contacts R7*c* to R7L transferred, the read out pulses applied to the counters are inverted in code sequence on a 9's complement basis as will be evident from an examination of Fig. 6. As a result, the 9's complement sum 9934 is read out of the counter and punched in its true number form as 0065.

At 145 degrees in the read out cycle, a circuit is completed from the power line 182, through cam contact CR24, the contacts R7*m*, through a sign control relay R8 to the power line 183. The energization of relay R8 causes its contacts R8*a* and *b* to close. The closing of the contacts R8*a* completes a circuit from the power line 182, through cam contact CR25, the contacts R8*a*, the hold coil of R8 to the power line 183. Relay R8 is held energized through CR25 until 187 degrees of this cycle. With contacts R8*b* closed, the closing of a cam contact CR22 at 170 degrees (X time), completes a circuit from the power line 182, through cam contact CR22, contacts R8*b*, conductor 201, through the jumper wire 202, and the punch magnet 194 of the thousands order punch to the power line 183. As a result, the X position of the thousands order column of the total record is punched to designate that the total indicated in this record is negative.

*Counter reset*

The accumulating machine is reset to its normal 9999 position when desired upon the manual closing of a reset key contact 204. The reset operation will be explained hereinafter in detail by resetting the counter from the previously accumulated total of 0065. With contact 204 closed, the closing of cam contact CR12 at 300 degrees of the cycle prior to the actual reset cycle completes a circuit from the power line 182, through key contact 204, the normally closed side of contact R5*a* of the interlock relay R5, the pick up coil of a reset relay R1 to the power line 183. The energization of the reset relay causes its contacts R1*a*, *b*, *g* to close and its contacts R1*c* to R1*f* to transfer. The reset relay is a latch type relay which maintains its associated contacts in the above described operative position after CR12 opens and deenergizes its pick up coil. The contacts R1*a* to R1*f* remain in their operative position until the closing of cam contact CR14 at 284 degrees in the next machine cycle energizes a latch trip coil $L_T$ of relay R1.

At 313 degrees in the cycle preceding the actual reset cycle, the closing of cam contact CR13 completes a circuit from the power line 182, through cam contact CR13, the normally open contacts R1*g*, now closed, the interlock relay R5 to the power line 183. The interlock relay is held energized through its contacts R5*a* and the closed reset key contact 204 until the reset key is released. As long as the interlock relay R5 is energized and its contact R5*a* is transferred, it is impossible for the pick up coil of the reset relay R1 to be reenergized. Thus, the interlock relay and its associated contacts R5*a* prevent more than one reset cycle of the accumulating machine if the reset key is held continuously closed.

At 315 degrees, the closing of cam contact CR15 completes the negative balance test circuit to the 9's contact 49, but, since the counter sum is positive, this contact is open and the invert relay R7 remains unenergized.

The closing of cam contact CR18 at 335 degrees of the cycle prior to the actual counter reset cycle, completes a circuit from the power line 182, through cam contact CR18, the normally open side of the contact R1*a*, now closed, the normally closed side of contact R7*b*, subtract magnet 117, and the paralleled coil P*u* of the counter entry magnet R4, to the power line 183. The energization of the magnet R4 causes its associated contacts R4*b* to R4*e* to transfer and its contact R4*a* to close. The closing of contact R4*a* completes a hold circuit for relay R4 which is accordingly held energized until 153 degrees of the next machine cycle. The energization of the subtract magnet 117 causes the surface 156 of the interposer 129 to be positioned under the hook member 123 carried by the subtract bail 97 in a manner previously explained in detail.

Beginning at 34 degrees (4 time) of the next cycle, which is the actual reset cycle, the momentary closing of cam contact CR6 completes a circuit from the power line 182, through cam contact CR6, the normally closed side of contact R7*h*, the conductor 197 to the 5 insert 34 of the units order counter, through the associated wiper 31 which is engaging this contact, the associated common insert 32, the normally closed side of contact R6*e*, the normally open contact R1*f*, now closed, the conductor 205, the normally open contacts R4*e*, now closed, and the units order counter magnet 59 to the power line 183. Simultaneous with the completion of the above circuit, the momentary closing of cam contact CR7 (34 degrees) completes a circuit from the power line 182, through cam contact CR7, the normally closed side of contact R7*i*, the conductor 199 to the 6 insert 34 of the tens order counter, through the associated wiper 31 which is engaging this insert, the associated common insert 32, the normally closed side of contact R6*d*, the normally open side of contact R1*e*, now closed, the normally open contact R4*d*, now closed, the tens order counter magnet 59 to the power line 183. As a result of the impulsing of the units and tens order counter magnets at this time in the cycle (4 time) the "4" selector 95 of each of these counters is operatively engaged with the associated add bail in a manner previously explained.

At 68 degrees ("2" time) in the reset cycle, the cam contact CR7 again closes to again impulse the tens order counter magnet 59 through the same circuit traced above. This results in the associated "2" selector 95 being engaged with the tens order add bail 98.

At 102 degrees (1 time) in the reset cycle, the cam contact CR6 again closes to again impulse the units order counter magnet 59 through the same circuit previously tracde. This results in the associated "1" selector 95 being engaged with the units order add bail 98.

After the above operations, only the "2′" and "2" selectors 95 of the units order counter remain in their normal position engaging the units order counter subtract bail; the "2′," "2" and "1" selectors 95 of the tens order counter remain in their normal position engaging the tens order subtract bail; the "4," "2′," "2" and "1" selectors 95 of the hundreds order counter remain in their normal position engaging the hundreds order subtract bail; and the "4," "2′," "2" and "1" selectors 95 of the thousands order counter remain in their normal position engaging the thousands order subtract bail.

With the selector levers 95 of the 4 counters in the above described positions, the upward movement of the interposer 129 at 187 degrees of the reset cycle, actuates the subtract bail of each of the counters and, as a result, the units order counter is advanced 4 units from its five position to its 9 position in the manner previously explained in detail, the tens order counter is advanced 3 units from its 6 position to its 9 position, the hundreds order counter is advanced 9 units from its 0 to its 9 position, and the thousands order counter is advanced 9 units from its 0 to its 9 position. The accumulating machine has accordingly been advanced from 0065 to the desired 9999 reset position.

Resetting of the counter when it contains a negative number differs from positive number reset in the following manner. Assume that the accumulating machine indicates 9934 which is the 9's complement representation of 0065. At 315 degrees of the cycle preceding the actual reset cycle, the closing of cam contact CR15 completes the negative balance test circuit through the now closed 9's contact 49 to energize the invert relay R7. The energization of the invert relay causes its associated contacts R7*b* to L to transfer and its contacts R7*a* and *m* to close. With the contact R7*b* transferred, the closing of cam contact CR18 at 335 degrees energizes the add magnet 118 of the counter and the paralleled counter entry relay R4. The energization of the add magnet 118 causes the surface 157 of the interposer 129 to be positioned under the hook member 119 carried by the add bail 98.

With the contacts R7*b* to R7L in their transferred position, inverted reset pulses as determined by the position of the wiper 31 of each counter are applied to the associated counter magnet 59. As a result of these reset pulses the 4 and 1 selectors 95 of the units order counter are engaged with the associated add bail 98 in a manner previously explained and the 4 and 2 selectors of the tens order counter are engaged with their associated add bail 98. All of the selectors 95 of the hundreds and thousands order counters remain engaged with their associated subtract bail 97.

With the selector levers 95 of the 4 counters in the above described positions, the upward movement of the interposer 129 at 187 degrees of the reset cycle actuates the add bail of each of the counters and, as a result, the units order counter is advanced 5 units from its five position to its 9 position, the tens order counter is advanced 6 units from its 3 position to its 9 position, and the hundreds and thousands order counters remain at their 9 position. The accumulating machine has accordingly been advanced from 9934 to the desired 9999 reset position.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An accumulating unit comprising, in combination, an accumulating wheel displaceable angularly into any one of ten distinctive decimal manifesting positions, a wheel advancing tape normally maintained free of engagement with said wheel, a plurality of selector elements operatively linked to said tape, each of said selectors being assigned a weighted decimal value in accordance with a predetermined code and adapted when operated to effect a corresponding displacement of said tape, said selectors singly or in combination representing all the decimal digits 1 to 9; means for engaging said tape with said wheel, and means for operating said selectors singly or in combination when said tape is so engaged to effect a corresponding displacement of said wheel.

2. An accumulating unit comprising, in combination, a toothed accumulating wheel displaceable angularly into any one of a plurality of value representative positions, a flexible tape having a series of openings therein each of which is slightly larger than a tooth of the accumulating wheel and spaced from its adjacent openings by a distance equal to the spacing between adjacent teeth of the wheel, a plurality of selectors operatively linked to said tape adjacent its one end, each of said selectors being assigned a weighted value in accordance with a predetermined code and adapted when actuated to effect a corresponding longitudinal displacement of said tape, a member yieldably supporting the other end of said tape, said member being movable from a first position wherein a tooth of said wheel meshes an aligned opening of said tape to a second position wherein said tape is free of engagement with said wheel, means for moving said member alternately from one to its other position, and means for operating said selectors singly or in combination when said member is in said first position wherein the resulting movement of said tape against the action of said yieldable means brings successive openings of said tape into momentary engagement with the corresponding teeth of said wheel thus displacing the wheel an angularly distance equal to the longitudinal displacement of said tape, said tape being later restored by said yieldable means as the movable member moves to said second position.

3. The accumulating unit as in claim 2 further characterized by a detent member carried by said movable member and engaged with said accumulating wheel during the time when said tape is disengaged from said wheel to prevent accidental rotation of said wheel.

4. An accumulating unit comprising, in combination, a counting wheel adapted to be advanced to any one of ten rotative positions representative of the decimal digits 0 to 9, a tape engageable with said wheel for effecting advancement thereof, means for shifting said tape alternately from a first position wherein the tape is free of said wheel to a second position wherein the tape is engaged with said wheel, means for sensing a record for a decimal digit represented therein, means for sensing said record for designations representing the algebraic sign of the record digit, a plurality of selectors operatively linked to said tape, each of said selectors being assigned a weighted decimal value in accordance with a self-complementing code, said selectors being adapted to be operated singly or in combination when said tape is in said first position to effect a longitudinal movement of the tape 1 to 9 units and a corresponding advance of said wheel; a subtract bail normally engaged by all of said selectors, an add bail, means responsive to said first sensing means for shifting said selectors singly or in combination into engagement with said add bail in accordance with the value of the record digit, the unshifted selectors which remain engaged with the subtract bail representing the 9's complement of the record digit, means responsive to said second sensing means for actuating said add bail if the record digit is positive and said subtract bail if the record digit is negative wherein actuation of said bail effects an operation of the selectors engaged therewith, and means for restoring said tape longitudinally upon disengagement from said wheel wherein said selectors operatively linked thereto and previously shifted into engagement with said add bail are reengaged with said subtract bail.

5. An accumulating unit comprising, in combination, an accumulating wheel rotatable differential amounts to represent digital entries therein, a differential advancing means for said wheel, means for sensing a succession of records for amounts encoded therein in a first combinational code, means for reading said records for designations representing the algebraic signs of the encoded amounts, a device having a plurality of settable elements each of which is assigned a weighted value in accordance with a self-complementing code, means controlled by said first reading means for setting a particular element or elements of said device representative of the amount in the record, the unset elements representing the 9's complement of the record amount, and means controlled by said second sensing means and acting upon and through the set elements if said record amount is positive for actuating said differential advancing means to rotate said wheel and amount equivalent to the record amount; and acting upon and through the unset elements if said record amount is negative for actuating said differential advancing means to rotate said wheel an amount equal to the 9's complement of the record amount.

6. A record controlled calculating machine comprising, in combination, a counting wheel adapted to be advanced to any one of ten rotative positions representative of the decimal digits 0 to 9, differential advancing mechanism for said wheel, means for reading a succession of records for decimal values represented therein by designations, singly or in combination, in 4 index areas assigned weighted significance of 1, 2, 4 and 8; means for reading said records for designations representing the algebraic signs of the related amounts, prior to the reading of the amounts; a device having 4 settable elements each of which is assigned a weighted value in accordance with a self-complementing 4, 2, $2^1$, 1 code; means controlled by said first reading means for setting a particular element or combination of elements of said device representative of the amount in a record, the unset elements representing the 9's complement of the record amount; and means controlled by said second sensing means and acting upon and through said set elements if the record amount is positive for rendering said advancing means operable to advance said wheel an amount representative of said record amount, and acting upon and through said unset elements if the record amount is negative for advancing said wheel an amount representative of the 9's complement of said record amount.

7. An accumulating unit comprising, in combination, a toothed counting wheel displaceable angularly into any one of a plurality of value representative positions, a tape having a series of openings therein each of which is spaced from its adjacent openings by a distance equal to the spacing between adjacent teeth of the wheel, means for shifting said tape alternately from a first position free of said wheel to a second position engaging said wheel wherein an opening in said wheel meshes an aligned tooth of said wheel so as to provide a driving connection therebetween, a plurality of elements operatively linked to said tape and settable to first and second positions, each of said elements being assigned a weighted value in accordance with a self-complementary code and adapted when actuated to effect a corresponding movement of said tape, means for sensing a succession of records for values encoded therein in a combinational code, means for reading said records for designations representing the algebraic signs of the encoded values, means controlled by said first reading means for setting a particular element or elements representative of the record value into said second position, the elements remaining in said first position representing a predetermined complement of the record value, means controlled by said second sensing means if the record value is positive and rendered operable when said tape is in said second position for actuating said elements set in said second position to effect a displacement of said tape and wheel an amount equivalent to said record value, means controlled by said second sensing means if the record value is negative and rendered operable when said tape is in said second position for actuating said elements set in said first position to effect a displacement of said tape and wheel an amount equivalent to a predetermined complement of said record value, and means acting upon said tape when in said first position for restoring said tape, the tape restoration in turn resetting all of said elements to said first position.

8. In a record controlled calculating machine having an accumulator provided with denominationally ordered accumulating wheels each having ten digit representing rotative positions, a flexible tape for each of said wheels and engageable therewith for effecting differential advance of said related wheel, yieldable means biasing said tape in one direction, means for engaging said tape with said related wheel, record controlled means for differentially advancing said tape when so engaged against the action of said yieldable means in accordance with the value to be entered in said related wheel, means for disengaging said tape from said wheel after said differential movement wherein said tape is restored by said yieldable means to a normal position, a transfer member rendered operative by said wheel as it passes from a 9 to a 0 representation position, and means controlled by said transfer member if rendered operative for effecting a differential movement of the tape of the next higher order accumulating wheel when engaged therewith to enter a carry into said related wheel.

9. An accumulating unit comprising, in combination, an accumulating wheel adapted to be displaced into any one of ten decimal manifesting positions, a differential advancing mechanism for said wheel, means for reading successive digit representing positions of a column of a record for perforations which, taken singly or in combination, represent all the decimal digits 1 to 9, means for reading said record for designations representing the algebraic sign of the related amount, prior to the reading of the amount; means controlled by said second reading means for impulsing a subtract magnet when said amount is negative and an add magnet when said amount is positive, an impulse responsive entry control device having an armature, a source of spaced impulses timed coincident with the reading of said digit representing positions of the record, a plurality of interposers each of which is assigned a weighted decimal value in accordance with a self-complementing code, each of said interposers being normally latched in an inoperative position by the armature of said entry device when unenergized, a code bar associated with each of said interposers and adapted to also normally latch it in said inoperative position, an add bail, a subtract bail, a selector associated with each of said interposers and normally engaged with said subtract bail, said selector being adapted when operated to effect a movement of said advancing mechanism in accordance with the weighted significance of its associated interposer, means responsive to said first reading means for directing one or a combination of said impulses to said entry device dependent upon the perforations sensed in said record, means for selectively operating each of said code bars at a particular time conicident with the sensing of particular digit positions of said record wherein said interposer is released if said entry device is impulsed at that time, means for actuating said released interposers wherein said associated selectors are disengaged from said subtract bail and engaged with said add bail, and means for actuating either said add bail or said subtract bail after said record is sensed dependent upon whether said add magnet or said subtract magnet, respectively, was previously impulsed.

10. An accumulating unit comprising, in combination, a toothed counting wheel adapted to be advanced to any one of ten rotative positions representative of the decimal digits 0 to 9, a flexible tape having a series of openings therein each of which is spaced from its adjacent openings by a distance equal to the spacing between adjacent teeth of said wheel, a member yieldably supporting the one end of said tape, said member being movable from a first position, wherein said tape tangentially engages said wheel with a tooth thereof meshing an opening of said tape for effecting a driving connection therebetween, to a second position, wherein said tape is free of engagement with said wheel; means for moving said member alternately from one to its other position, four selectors operatively linked to said tape adjacent to its other end, each of said selectors being assigned a weighted value in accordance with a 4, 2, $2^1$, 1 self-complementing code and adapted when actuated to effect a corresponding movement of said tape and wheel, and means for reading successively 4 digit representing positions of a column of a record for perforations, said positions being assigned weighted significance 8, 4, 2 and 1 and representative if perforated singly or in combination, of any decimal digit 1 to 9; means for reading said record for designations representing the algebraic sign of the related amount, an impulse responsive control device having an armature, a source of spaced impulses timed coincident with the sensing of said digit representing positions of the record, an interposer operatively linked to each of said selectors, each of said interposers being normally latched in an inoperative position by the armature of said device when unenergized, a second latching member associated with each of said interposers and also adapted to normally maintain said interposer in an inoperative position, an add bail, a subtract bail normally engaged by all of said selectors, means responsive to said first reading means for selectively directing one of said impulses to said impulse responsive device upon each sensing of a perforation, means for selectively releasing each of said second latching devices at a particular time or times coincident with the sensing of particular digit positions of said record wherein said interposer is released if said impulse responsive device is simultaneously impulsed as a result of a perforation in said position, means operable after the sensing of the last digit position of said record for actuating said released interposers wherein each of said operatively linked selectors is disengaged from said subtract bail and engaged with said add bail, means responsive to said second sensing means if said record amount is positive for actuating said add bail when said tape is engaging said wheel, wherein the resultant operation of the selectors engaged therewith displaces said tape longitudinally against the action of said yieldable means to effect a displacement of said wheel an amount equal to said record amount, and means responsive to said second sensing means if said record amount is negative for actuating said subtract bail when said tape is engaging said wheel, wherein the resultant operation of the selectors engaged therewith effects a displacement of said wheel an amount equal to the 9's complement of said record amount.

11. An accumulating unit comprising, in combination, a toothed counting wheel displaceable rotatively into any one of a plurality of value representative positions, a tape having a series of openings therein, means for shifting said tape into driving engagement with said wheel with an opening in said tape at the area of engagement being meshed by an adjacent tooth of said wheel, a plurality of selectors operatively linked to said tape, each of said selectors being assigned a distinctive weighted value in accordance with a first predetermined combinational code, and adapted when actuated to effect a corresponding displacement of said tape, means for sensing a record for a value represented therein in a second combinational code, translating mechanism interposed between said sensing means and said selectors for effecting an adjustment from a first to a second position of one or a combination of the selectors, equivalent numerically in said first code to the value sensed in said second code, and means for actuating said selectors in said second position when said tape is engaging said wheel.

12. In a record controlled calculating machine having a plural order accumulator, each order of which comprises a counting wheel displaceable angularly into different value representative positions, a flexible tape for each of said wheels and engageable therewith for effecting angular displacement thereof, yieldable means biasing said tape in one direction, means for engaging said tape with said related wheel, record controlled means for advancing said tape when so engaged against the action of said yieldable means in accordance with the value to be entered in said related wheel, means for disengaging said tape from said wheel after said differential movement wherein said tape is restored by said yieldable means, a transfer member rendered operative by said wheel as it passes from a first to a second predetermined position, and means controlled by said transfer member if rendered operative for effecting a movement of the tape of the next higher order counting wheel when engaged therewith to enter a carry into said related wheel.

References Cited in the file of this patent

UNITED STATES PATENTS

| Number | Name | Date |
|---|---|---|
| 2,059,252 | Lasker | Nov. 3, 1936 |